United States Patent [19]
Edlinger

[11] Patent Number: 6,068,677
[45] Date of Patent: May 30, 2000

[54] METHOD FOR PROCESSING WASTE OR WASTE FRACTIONS, IN PARTICULAR CAR SHREDDER LIGHT FRACTIONS

[75] Inventor: Alfred Edlinger, Baden, Switzerland

[73] Assignee: "Holderbank" Financiere Glarus AG, Glarus, Switzerland

[21] Appl. No.: 08/875,769

[22] PCT Filed: Dec. 6, 1996

[86] PCT No.: PCT/AT96/00248

§ 371 Date: Aug. 5, 1997

§ 102(e) Date: Aug. 5, 1997

[87] PCT Pub. No.: WO97/21843

PCT Pub. Date: Jun. 19, 1997

[30] Foreign Application Priority Data

Dec. 11, 1995 [AT] Austria .................................... 2005/95

[51] Int. Cl.⁷ .................................................. C22B 7/00
[52] U.S. Cl. .............................. 75/500; 75/623; 75/628; 75/638; 75/690; 75/703; 75/958; 423/594
[58] Field of Search .............................. 75/623, 500, 628, 75/638, 690, 703, 958; 423/594

[56] References Cited

U.S. PATENT DOCUMENTS 5,302,184  4/1994  Batterham et al. ........................ 75/623

FOREIGN PATENT DOCUMENTS

| | | |
|---|---|---|
| 115 928 | 8/1984 | European Pat. Off. . |
| 185 004 | 6/1986 | European Pat. Off. . |
| 335 033 | 10/1989 | European Pat. Off. . |
| 551 992 | 7/1993 | European Pat. Off. . |
| 572 769 | 12/1993 | European Pat. Off. . |
| 707 083 | 4/1996 | European Pat. Off. . |
| 714 860 | 6/1996 | European Pat. Off. . |
| 41 23 626 | 1/1993 | Germany . |
| 785 325 | 10/1957 | United Kingdom . |

OTHER PUBLICATIONS

Patent Abstracts of Japan, vol. 96, No. 3, Mar. 29, 1996 & JP 07 30031 A; Nov. 14, 1995.

*Primary Examiner*—Melvyn Andrews
*Attorney, Agent, or Firm*—Pillsbury Madison & Sutro LLP

[57] ABSTRACT

The method for processing waste or waste fractions, such as, for example, household refuse, car shredder light fractions or the like, provides for pyrolysis, gasification and/or combustion, whereupon the residues are melted under reducing conditions. The reduced portions are then are subjected to a stepwise oxidation, with chromium being quantitatively separated in a first oxidation stage. After this, a calcium ferrite slag is formed by further oxidation, whereupon the remaining metal bath is further processed in order to recover nonferrous heavy metals.

13 Claims, No Drawings

METHOD FOR PROCESSING WASTE OR WASTE FRACTIONS, IN PARTICULAR CAR SHREDDER LIGHT FRACTIONS

This application is the national phase of international application PCT/AT96/00248, filed Dec. 6, 1996 which was designated the U.S.

BACKGROUND OF THE INVENTION

1. Field of the Invention

The invention relates to a method for processing waste or waste fractions, such as, e.g., household refuse, car shredder light fractions or the like, by subjecting the charging material to pyrolysis, gasification and/or combustion.

2. Description of the Related Art

Known methods for such waste processing are aimed at ensuring slagging to as large an extent as possible, whereupon higher-grade end products are to be obtained by a suitable aftertreatment of the slag. Thus, the aim of known procedures was to initally ensure complete slagging to as large an extent as possible and completely oxidize any combustible components, whereupon portions or alloys capable of being metallized by concerted reduction steps were again separated from the slag.

Especially with residues strongly loaded with heavy metals and, in particular, chromium-containing residues such a slag melt, complete oxidation of the starting materials is extremely agressive. Also, it has been proved that the separation of extremely troublesome components, such as chromium, in classical process control is feasible only at the end of the process and not to the extent desired and that all of the preceding fractions remain more or less strongly contaminated, for instance, with chromium.

SUMMARY OF THE INVENTION

The invention aims at providing a method of processing waste in which undesired metals can more readily be separated and by which purer products can be made available for further processing. The invention, in particular, aims at producing synthetic blast furnace slag and at separating marketable metal compounds and metal alloys. To solve this object, the invention essentially resides in that the residues from pyrolysis, gasification and/or combustion are heated under reducing conditions and that the reduced metallic components are subjected to stepwise oxidation, wherein in a first oxidation stage sufficient oxygen is made available to ensure the quantitative reaction to chromic iron. By the fact that the residues mentioned above are no longer subjected to complete oxidation as opposed to the known mode of procedure, but, by contrast, are melted under reducing conditions, a slag is immediately formed in which the portion of metal oxides is substantially reduced. Above all, it can be ensured that the slag drawn off the reducingly run shaft furnace offers a substantially better purity, since the slag is not inadmissibly contaminated with heavy metals and/or chromium. Heavy-metal chlorides will volatilize by the reducing mode of procedure taking place within the shaft furnace and may be recovered in the form of filter dusts. Such filter dusts as, for example, $CuCl$, $ZnCl_2$ and $PbCl_2$ subsequently may be washed basic and added to the consecutively arranged oxidation converter prior to refining, wherein the heavy-metal oxides formed are reduced and zinc, lead, cadmium or mercury may, for instance, be recovered from the gaseous phase. With that mode of procedure, copper, nickel, tin and antimony enter into the metal bath; chromium is quantitatively separable in a particularly simple manner already by a first oxidation. That quantitative separation of chromium in a first oxidation stage following upon the reducing melting procedure will directly result in substantially purer further products, which, in the following, may be processed to usable metals or metal alloys. The early elimination of chromium consequently also reduces the risk of the converter lining being destroyed prematurely and at the same time renders feasible the obtainment of an intermediate product to be readily utilized later on for recovering chromium.

Advantageously, the chromium-containing spinel floating on the surface is drawn off and reduced to a ferro-chromium-carburé alloy. As an alternative, oxidation to chromium oxide might, of course, also take place. At refining temperatures of above 1350° C. the chromium oxide formed, which has a melting point of 2435° C., would likewise be separated and likewise could be drawn off the melt. In that case, the addition of further processing agents, such as high-performance grinding agents, color pigments or the like would be feasible.

In accordance with a preferred further development of the method according to the invention it is proceeded in a manner that, after having drawn off the chromium spinel fraction, lime or limestone is applied onto the metal surface and the oxidation potential is raised in order to form a calcium ferrite slag, limestone advantageously being continuously added as a coolant.

By adding lime or quick lime, heavy-metal sulphur compounds, in particular $Cu_2S$, are decomposable already in the reducing melt with $Cu_2O$ and CaS is formed. After this, $Cu_2O$ may be reduced with CO, copper collecting in the boshes and CaS being capable of slagging.

During the reducing meltdown procedure iron oxides are reduced and sponge iron is, for instance, formed. Advantageously it may be proceeded in a manner that Al is introduced, in particularly blown, into the metal bath of the meltdown reactor, aluminium, in particular scrap aluminium thus alloying, in the lower region of the shaft furnace, with the liquid metal phase forming. A synthetic blast furnace slag floats on the liquid metal phase of the reducing melting procedure, wherein chromium oxide contents of the slag that have not yet been reduced by carbon monoxide are reduced into the alloy in a practically quantitative manner on account of the liquid aluminium iron alloy thus formed. In doing so, aluminium may, for instance, be blown into the liquid metal phase of the reducing meltdown reactor as a back-up means in the form of aluminium powder by aid of immersed nozzles.

After having separated chromium and the calcium ferrite slag formed, advantageously the metal bath remaining upon tapping of the calcium ferrite slag is refined to such an extent that the iron content is adjusted to below 80% by wt., preferably 40 to 60% by wt., the balance being Cu, Sb and other iron companions. Such a metal bath is suitable for preparing valuable nonferrous heavy metal alloys or for further recovering pure metals.

As already mentioned, reduction heating advantageously is effected in a meltdown reactor, in particular, in a shaft furnace with the addition of lime, bauxite and coke, the appropriate reducing atmosphere within the shaft furnace being safeguarded in a simple manner by charging 350 to 600 kg, in particular 500 kg, of coke per ton of charging material.

To improve the energy balance, advantageously the metal bath drawn off the melt-down reactor is introduced into the first oxidation stage in the liquid state. Alternatively, the tap may, of course, also be cast into billets or blooms, the billets or blooms subsequently being further melted in an appropriate central converter.

As pointed out above, the liquid slag formed during the reducing melting procedure is largely free of heavy metals and chromium, standing out for its substantially reduced iron oxide contents. Advantageously, the liquid slag of the reducingly run shaft furnace is granulated, ground and mixed with cement. In order to improve the energy balance, the combustible gases drawn off the shaft furnace, moreover, may be used as reducing agents in a direct reduction process.

In the oxidation converter differentation of the metal bath between two metal melt phases may be observed at certain temperatures. Such a formation of separate metal melt phases may be used for optionally desired additional pre-separations, that mode of procedure naturally being of relevance only if residues with relatively high copper contents are worked up. Advantageously, a phase separation is effected in the oxidation reactor, wherein a heavier Cu-phase containing 4 to 10% by wt. Fe, Sn, Ni and Sb<5% by wt., and a lighter Fe-phase containing 5 to 10% by wt. Cu and residual amounts of Sn, Ni, Sb and Cr, are drawn off at 1280 to 1350° C., whereupon the lighter phase is subjected to said first oxidation, phase separation as mentioned before seeming reasonable only if an important amount of copper phase has already formed at that stage.

In the following the invention will be explained in more detail by way of an exemplary embodiment.

EXEMPLARY EMBODIMENTS

Charging Material Analysis:

| Overall analysis: | |
|---|---|
| $C_{fix}$ | 10% by wt. |
| Scrap iron | 10% by wt. |
| Scrap aluminium | 2% by wt. |
| Minerals | 78% by wt. |
| Mineral analysis: | |
| $SiO_2$ | 47% by wt. |
| CaO | 16% by wt. |
| $Al_2O_3$ | 11% by wt. |
| $Fe_2O_3$ | 9% by wt. |
| MgO | 3% by wt. |
| $Na_2O$ | 4.5% by wt. |
| $K_2O$ | 1.5% by wt. |
| $TiO_2$ | 2% by wt. |
| Cl | 0.8% by wt. |
| $SO_3$ | 1.5% by wt. |

| -continued | |
|---|---|
| Cu | 1.2% by wt. |
| Cr | 0.5% by wt. |
| Zn | 0.7% by wt. |
| Pb | 0.4% by wt. |
| Sb | 0.1% by wt. |

One ton of gasification residue was mixed with 220 kg quick lime, 100 kg bauxite ($Al_2O_3$) and 500 kg coke, charged into the reducingly operated shaft furnace and liquefied by melting.

Products:

The slag tapped at 1500° C. had the following analysis:

| $SiO_2$ | 41% by wt. |
|---|---|
| CaO | 32% by wt. |
| $Al_2O_3$ | 17% by wt. |
| MgO | 2.5% by wt. |
| $Na_2O$ | 3% by wt. |
| $K_2O$ | 1% by wt. |
| $TiO_2$ | 2% by wt. |
| S | 0.5% by wt. |

The heavy-metal analysis revealed concentrations of below 100 ppm for each element. The liquid slag was water-spray ranulated, ground (to 3200 Blaine) and mixed with Portland cement. This blast furnace cement is superior to the conventional one, thus a wedge index after 28 days of 115% was, for instance, reached.

The furnace pig tapped at 1500° C. has the following composition:

| Fe | 87% by wt. |
|---|---|
| Cu | 6% by wt. |
| Cr | 3% by wt. |
| Sb | 1% by wt. |
| C | 3% by wt. |

The liquid furnace pig was stepwise oxidized partially (at an increasing oxidation potential) in a discontinuously operated oxidation converter.

1.) Spinel Formation

Chromic iron (spinel) was obtained as the first oxidation product, separating on the surface of the metal bath in the form of solid spinel crystals. The spinel was drawn off. The oxidation potential was adjusted, e:g., by aid of an $O_2/N_2$ mixture such that the spinel formation was optimized.

Chemical composition of said spinel: $FeO-Cr_2O_3$.

In order to form the spinel mentioned, Cr, C and some Fe had to be oxidized. Oxidation with $O_2$ occurs practically quantitatively. To this end, 60 kg $O_2$ were required in the instant case (example). 15 kg Fe were oxidized to FeO with 70 kg CO forming. The data refer to 1 ton of furnace pig.

Hence, 66.3 kg chromic iron were formed per ton of furnace pig, from which chromic iron said ferro-chromium-carburé alloy may be produced.

Since the reaction is very exothermic, oxidation may be effected also with $CO_2$ and/or a $CO_2/O_2$ mixture at a lower oxidation enthalpy to save energy.

Another variant of spinel formation resides in producing "magnesium spinel" ($MgCr_2O_4$), a raw material suitable for the refractory industry. In doing so, magnesite powder ($MgCO_3$) is blown into the melt:

$MgCO_3$ MgO+$CO_2$
2 Cr+3 $CO_2$ $Cr_2O_3$+3 CO
MgO+$Cr_2O_3$ $MgCr_2O_4$

The CO formed may, of course, be utilized in the process metallurgically and/or energetically.

The chromic-iron spinel conventionally may be reduced to a high-percent ferro-chromium-carburé alloy having the following composition: 33% by wt. Fe, 61% by wt. Cr and 6.5% by wt. C.

2.) Ferrite Slag Formation

After all of the chromium had been converted into spinel, the oxidation potential was raised and ground limestone was applied onto the surface of the metal bath. The iron of the metal bath was slagged in an oxidizing manner with a highly liquid calcium ferrite slag forming. Since the "iron combustion" was extremely exothermic, the use of limestone as a "coolant" had proved very advantageous.

The contents of the converter (after spinel formation) had the following composition: 92% by wt. Fe, 6.5% by wt. Cu, 1% by wt. Sb. Thus, 620 kg Fe had to be slagged as ferrite in order to increase the content of the Cu/Sb alloy from 7.5% to 20% (consumer copper mill). To this end, 266 kg $O_2$ (in air, $CO_2$ from calcining) and 554 kg $CaCO_3$ were required. There were formed 1,200 kg ferrite slag/ton (converter melt).

$CaCO_3$ CaO+$CO_2$ (calcining=cooling effect)
CaO+$Fe_2O_3$ $CaFe_2O_4$ (ferrite formation)

These slags had iron contents ranging between 45 and 55%, thus constituting ideal burdening components for the pig-iron blast furnace.

3.) Copper Alloy

In the converter there remained a copper alloy having the following composition: 83% by wt. Cu, 12% by wt. Sb, 3% by wt. Fe.

The overall energy balance of the method was calculated as follows:

Reduction

Theoretically, 2,025 MJ/t energy are required for heating the gasification residue to melting temperature. That heating and melting procedure takes place within the shaft furnace, which has a thermal efficiency of 65%. Thus, an actual heat consumption of about 3.5 GJ/t must be taken into account. In order to procure that amount of heat, approximately 600 kg C/t must be gasified to CO. Since the analysis of the gasification product already shows 10% $C_{fix}$, 800 kg $O_2$ as well as 500 kg coke, slack coal, PETKOK or the like are used for that purpose.

The gasification oxygen optionally may be replaced with air wholly or partially.

Approximately 1,400 kg CO/t (=14 GH/t) leave the shaft furnace, which may advantageously be used in the cement industry as an alternative fuel after gas treatment (e.g., activated coke filters, counterflow). Another application would be the use as a reductant in a direct reduction process (e.g., Midrex).

Oxidation

The oxidation within the converter is strongly exothermic on account of the formation of spinel and of ferrite slag. For the formation of spinel water vapor, air, $O_2$, optionally diluted with N2 or Ar, iron ore or ferrite slag, and for the formation of ferrite slag air and/or $O_2$, may be progressively used as oxidizing agents.

I claim:

1. A method for processing waste or waste fractions comprising:

pyrolyzing, gasifying, and/or combusting charging material obtained from waste or waste fractions to produce residues, the charging material containing, as metallic components, at least chrome, iron, and other constituents for forming chrome-iron spinel;

prior to any oxidation of the residues, heating the residues under reducing conditions to reduce the metallic components and form a metal bath and thereafter subjecting the reduced metallic components to stepwise oxidation, the stepwise oxidation including an oxidation stage in which sufficient amounts of oxygen are present to ensure quantitative reaction of the reduced metallic components to form a chrome-iron spinel;

drawing off the chrome-iron spinel form a surface of the metal bath and reducing the chrome-iron spinel with carbon to ferrochromium-carbon alloy; and after said drawing off of the chrome-iron spinel, applying lime or limestone onto the surface of the metal bath and raising the oxidation potential to form calcium ferrite slag.

2. A method according to claim 1, wherein said applying of the lime or limestone comprises continuously applying the lime or limestone as a coolant.

3. A method for processing waste or waste fractions comprising:

pyrolyzing, gasifying, and/or combusting charging material obtained from waste or waste fractions to produce residues, the charging material containing, as metallic components, at least chrome, iron, other constituents for forming chrome-iron spinel, copper, and antimony;

prior to any oxidation of the residues, heating the residues under reducing conditions to reduce the metallic components and form a metal bath and thereafter subjecting the reduced metallic components to stepwise oxidation, the stepwise oxidation including an oxidation stage in which sufficient amounts of oxygen are present to ensure quantitative reaction of the reduced metallic components to form a chrome-iron spinel;

drawing off the chrome-iron spinel from a surface of the metal bath and reducing the chrome-iron spinel with carbon to ferrochromium-carbon alloy;

after said drawing off of the chrome-iron spinel, applying lime or limestone onto the surface of the metal bath and raising the oxidation potential to form calcium ferrite slag; and refining the calcium ferrite slag to impart an iron content of below 80% by weight, with the balance being Cu, Sb, and other iron companions from the metallic components.

4. A method for processing waste or waste fractions comprising:

pyrolyzing, gasifying, and/or combusting charging material obtained from waste or waste fractions to produce residues, the charging material containing, as metallic components, at least chrome, iron, other constituents for forming chrome-iron spinel, copper, and antimony;

prior to any oxidation of the residues, heating the residues under reducing conditions to reduce the metallic components and form a metal bath and thereafter subjecting the reduced metallic components to stepwise oxidation, the stepwise oxidation including an oxidation stage in which sufficient amounts of oxygen are present to ensure quantitative reaction of the reduced metallic components to form a chrome-iron spinel;

drawing off the chrome-iron spinel from a surface of the metal bath and reducing the chrome-iron spinel with carbon to ferrochromium-carbon alloy;

after said drawing off of the chrome-iron spinel applying lime or limestone onto the surface of the metal bath and raising the oxidation potential to form calcium ferrite slag; and refining the calcium ferrite slag to impart an iron content of from 40% by weight to 60% by weight, with the balance including Cu and Sb.

5. A method according to claim 1, wherein said heating of the residues under reducing conditions is effected in a meltdown reactor.

6. A method according to claim 5, wherein said heating of the residues under reducing conditions further comprises adding lime, bauxite, and coke.

7. A method according to claim 5, wherein the meltdown reactor is a shaft furnace.

8. A method according to claim 1, further comprising charging 350 to 600 kg of coke per ton of charging material.

9. A method according to claim 1, wherein the metal bath is in a liquid state during the oxidation stage.

10. A method according to claim 7, further comprising generating slag in and drawing the slag off from the shaft furnace, and then granulating, grinding, and mixing the slag.

11. A method according to claim 7, further comprising drawing off combustible gases generated in the shaft furnace from the shaft furnace and applying the combustible gases as reducing agents.

12. A method according to claim 5, further comprising blowing, aluminum into the metal bath while the metal bath is in the meltdown reactor.

13. A method according to claim 3, wherein the metallic components of the waste or waste fractions further include tin and nickel, and wherein said method further comprises phase separation in an oxidation reactor step in which a heavier copper-phase containing 4% to 10% by weight of Fe, Sn, and Ni and less than 5% by weight of Sb and a lighter Fe-phase containing 5% to 10% by weight Cu and residual amounts of Sn, Ni, Sb, and Cr are drawn off at 1280° C. to 1350° C., wherein the lighter Fe-phase is subjected to said first oxidation stage.

* * * * *